United States Patent [19]

Fohl

[11] 3,967,794
[45] July 6, 1976

[54] DEVICE FOR INITIATING THE BLOCKING OF A REEL SHAFT FOR A SAFETY BELT WINDING-UP AUTOMAT

[76] Inventor: Artur Fohl, Schelmenwasenstr. 68, 7061 Haubersbronn, Germany

[22] Filed: Jan. 20, 1975

[21] Appl. No.: 542,382

[30] Foreign Application Priority Data
Jan. 21, 1974 Germany............................ 2402748

[52] U.S. Cl. .................... 242/107.4 R; 242/107.4 B
[51] Int. Cl.² ......................................... A62B 35/00
[58] Field of Search ............. 242/107.4 B, 107.4 R, 242/107.4 A; 310/305; 280/150 SB; 188/82.77; 297/386, 387, 388

[56] References Cited
UNITED STATES PATENTS

| | | | |
|---|---|---|---|
| 2,708,966 | 5/1955 | Davis .......................... | 242/107.4 A |
| 3,294,339 | 12/1966 | Fontaine ...................... | 242/107.4 R |
| 3,787,002 | 1/1974 | Hayashi ........................ | 242/107.4 R |
| 3,876,031 | 4/1975 | Stouffer ....................... | 242/107.4 R |

*Primary Examiner*—Edward J. McCarthy
*Attorney, Agent, or Firm*—Walter Becker

[57] ABSTRACT

A device for blocking the shaft of a safety belt mechanism in which the blocking of the shaft is initiated in response to acceleration of the shaft in pay-out direction. An inertia responsive disc element is mounted on the shaft and movement thereof on the shaft initiates blocking of the shaft. To augment the inertia effect a magnet adjacent the disc provides a retarding effect thereon by the magnetic field from the magnet or by eddy currents in the disc induced therein by the field.

12 Claims, 9 Drawing Figures

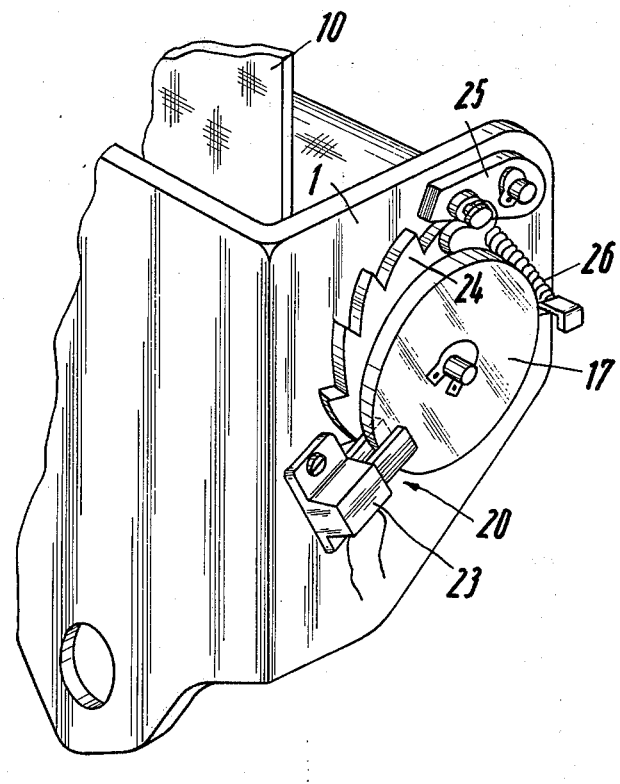
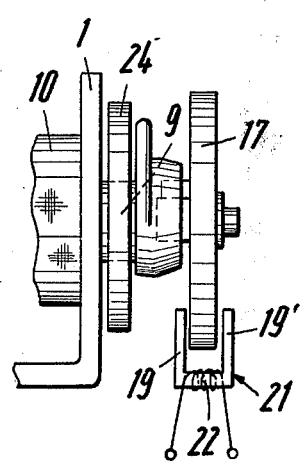
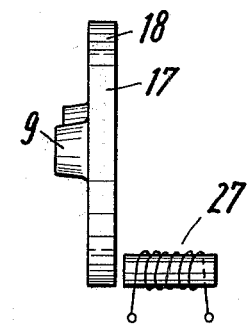

DEVICE FOR INITIATING THE BLOCKING OF A REEL SHAFT FOR A SAFETY BELT WINDING-UP AUTOMAT

The present invention relates to a device for initiating the blocking of the reel shaft of a safety belt winding automat, which device is adapted to be controlled into the blocking position by means of an inertia responsive part, said device including a clutch disc which is rotatable relative to the reel shaft.

A heretofore known device of the type involved has a ball-shaped mass element which in its rest position is located in a supporting socket while a control lever linked to a housing wall rests on said mass ball. A latching member which rests on the free end of said control lever is adapted to cooperate with a control disc resting on the reel shaft for the safety belt. When an admissible delaying or accelerating value has been exceeded, the mass ball due to its inertia rolls out of the center of the supporting socket thereby lifting the control lever resting thereon. The latching member on the free end of the control lever is correspondingly shifted upwardly and comes into engagement with the control disc. The latching member will then be carried along by the control disc when the latter turns up to an abutment. The latching member and thus the control disc will in this way be prevented from continuing its rotation whereby the reel shaft for the safety belt is automatically blocked.

With this embodiment, movable parts are provided which in order to be able to initiate the blocking operation, have to move over a certain latching path. Even when this path or stroke is relatively short, the time of response of the blocking mechanism is unnecessarily increased. A further drawback of this arrangement consists in that friction forces occur at the bearing areas of the individual control members, which friction forces bring about a reduction in the response sensitivity. In view of its relatively expensive construction, this mechanically operating device is too expensive to make.

It is, therefore, an object of the present invention to provide a device for initiating the blocking of the reel shaft, according to which the control can be effected without the movement of masses, and in particular while reducing the number of structural elements, so that the device will have an extremely short time of response and will have a high response sensitivity.

It is another object of this invention to provide a device as set forth in the preceding paragraph which is simple in construction and can easily be installed in vehicles.

These and other objects and advantages of the invention will appear more clearly from the following specification, in connection with the accompanying drawings, in which:

FIG. 6 is an isometric partial view of a blocking device according to the invention with a force of field exciter, in which the device is equipped with a control and inertia disc which is blocking in radial direction.

FIG. 7 is a side view of FIG. 6.

FIG. 8 shows the arrangement of a rod-shaped electromagnet parallel to the reel shaft.

Figure 9:
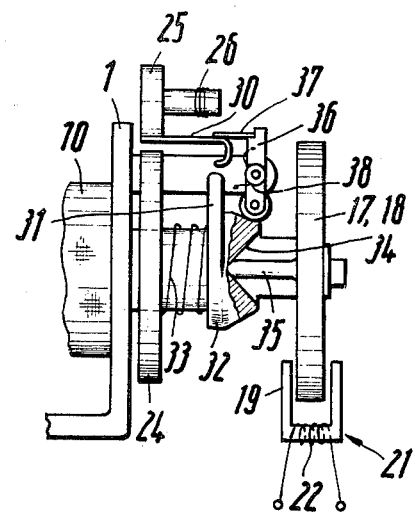

FIG. 9 schematically shows the modification of FIGS. 6 to 8 in more detail.

The device according to the present invention is characterized primarily in that it comprises at least one force of field exciter arranged in the circumferential region of the coupling disc while the field of said force of field exciter passes through the circumferential region of the clutch of the coupling disc and is variable for initiating the blocking operation.

According to a further development of the invention, within the circumferential region of the coupling disc there are provided a plurality of preferably uniformly distributed tooth-shaped braking bodies of a ferromagnetic material. These braking bodies are associated with a certain latching position which is formed on the housing, for instance, by axially protruding blocking cams.

Referring now to the drawings in detail, it will be seen from FIGS. 1 – 4, that on the housing sidewall 1 of the device there is provided a rod-shaped electromagnet 2 which is arranged in a bearing 4, which latter is connected by screws 3 to the housing sidewall 1 and is located radially with regard to the reel shaft 9 for the safety belt 10. The iron core 5 of the electromagnet 2 is surrounded by a coil 6. That end 7 of the iron core 5 which projects from the bearing 4 is designed in the manner of a cutting blade and has a slight distance from the coupling disc 8. Coupling disc 8 is rotatable and axially displaceable in the vicinity of the free end on the reel shaft 9 for the safety belt 10 which projects beyond the housing sidewall 1. On the circumference of the coupling disc 8 in evenly spaced arrangement there are provided tooth-shaped brake bodies 11 which are connected to the circumference of said coupling disc 8. These brake bodies 11 are made of a ferromagnetic material and have their blade-like ends project beyond the circumference of the coupling disc 8. The blade 12 of the brake body 11 or the blade 7 of the iron core 5 extend parallelly with regard to the axis of the reel shaft 9 so that the blades 7, 12 which face each other extend parallel to each other. Instead of the coupling disc 8, also a one or more layer ring 13 punched out of a dynamo metal sheet may be employed. This ring 13 is provided with radially extending tooth-shaped elevations 14 which extend uniformly along the circumference of said ring 13.

Figure 1:
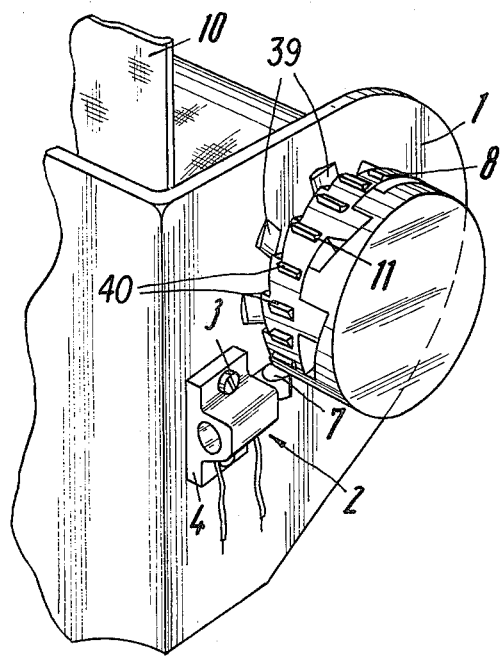
FIG. 1 illustrates an isometric partial view of an axially blocking device with a field of force exciter according to the invention.
Figure 2:
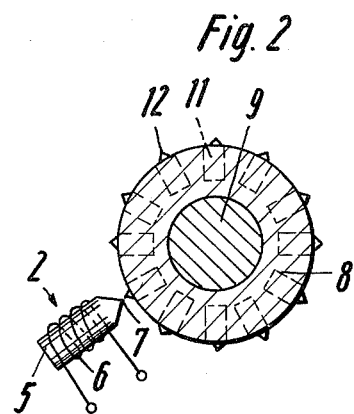
FIG. 2 shows the principle of a rod-shaped electromagnet.
Figure 3:
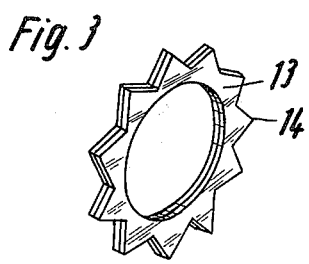
FIG. 3 is a perspective view of a multilayer ring of ferromagnetic material with radially arranged tooth-shaped elevations.
Figure 4:
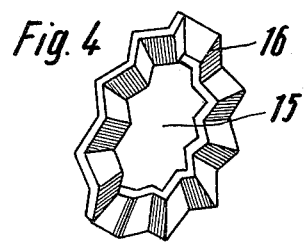
FIG. 4 is a perspective illustration of a ring of ferromagnetic material with axially arranged tooth-shaped elevations.
Figure 5:
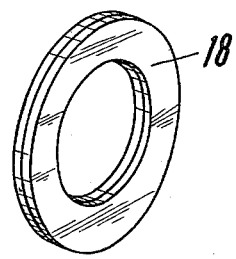
FIG. 5 represents a multilayer disc of ferromagnetic material.

According to the embodiment illustrated in FIG. 4, the one or more layer ring 15 punched of dynamo sheet metal is designed zigzag shaped and provided with tooth-shaped axially arranged elevations 16. Also with this embodiment of the invention, coupling discs and brake discs form a single structural element.

Ring 13 and ring 15 are sprayed with a suitable material as, for instance, aluminum and are combined to form a coupling disc unit. Inasmuch as rings 13 and 15 are formed by punching, the mounting of the radial and axial elevations 14 and 16 respectively as brake bodies can be carried out in a simple and responsive manner.

When the vehicle exceeds a certain permissible acceleration or retardation value, the control switch or sensor of the device is put into action. The coil 6 is passed through by a current whereby an electric field will be generated. Since the braking bodies 11 at the circumference of the coupling disc 8 are produced from a ferromagnetic material, a magnetic field will form between the iron core 5 and the said brake bodies 11. During the rotation of the coupling disc 8, the blades 12 of the brake bodies 11 and the blade 7 of the iron core 5 extend parallel to each other. In view of the blade-like design of the two ferromagnetic members 5 and 11, the magnetic field is at a relatively low current intensity effective for retarding the coupling disc 8 and, due to the relative rotation thus resulting between the reel shaft 9 and the coupling disc 8, the blocking operation will be initiated in a known manner, for example, by causing the disc 8 toward sidewall 1 and causing teeth on disc 8 to engage teeth on side wall 1. When the tensioning at the safety belt 10 decreases, the coupling disc 8 is, due to the tension of a spring, moved axially away from side wall 1 out of the blocking position whereby the blocking is undone.

A special advantage of this embodiment consists in that the coupling disc forms a single part with the brake bodies. As a result thereof, a higher safety of operation of the device and an extremely simple and compact construction will be assured. Since the coupling disc 8 with the brake body simultaneously also serves as latching body, separate or additional latching elements are not necessary. The friction forces occurring at the bearing areas of such latching parts, which friction forces reduce the response sensitivity are avoided by the design of the coupling disc according to the invention so that a very short time of response of the device and thus a maximum of safety will be assured for the vehicle operator and passengers.

The design with electromagnets 2 arranged radially with regard to the reel shaft 9 is particularly suitable for that embodiment of the invention according to which the coupling disc after the holding-fast operation is axially displaced.

Designs of rolling-up automats have become known according to which the blocking operation is initiated by holding fast a control or inertia disc which is arranged only for rotation but is not axially displaceable on the reel shaft 9. The design of the device for initiating the reel shaft blocking for this type of winding-up automat is illustrated in FIGS. 5 – 8. On that end of the reel shaft 9 which projects from the housing sidewall 1 there is connected a clutch disc which is designed as control or inertia disc 17. On the circumferential region of the said coupling disc there is arranged a smooth ring 18 made of a ferromagnetic material.

With the embodiment illustrated in FIG. 6, the control or inertia disc 17 consists of a paramagnetic material such as aluminum. It is, however, also possible not to make the entire disc 17, but only its circumferential region of a paramagnetic material. The employment of a paramagnetic material for this purpose has the advantage that the disc 17 can be made in a chipless manner from a cheap material such as aluminum. The control or inertia disc 17 which again forms with the ring 18 a single structural element is located between the legs 19, 19' of an electromagnet 20, the horseshoe-shaped iron core 21 of which is surrounded by a coil 22. The electromagnet 20 which extends radially with regard to the reel shaft 9 is arranged in a housing 23 which is connected to the housing sidewall 1. Between the two legs 19, 19' of the electromagnet 20 and through the periphery of the control or inertia disc 17, a magnetic field is built up. Inasmuch as the control or inertia disc 17 immerses with slight play into the magnet 20, it will be appreciated that in view of the movement of the disc 17 during the acceleration or retardation an eddy current braking action will be brought about, as a result of which, the disc 17 is prevented from continuing its rotation, or is retarded relative to the reel shaft, and this will initiate the blocking of shaft 9.

A blocking disc 24 which is fixed to the free end of the reel shaft 9 behind the control or inertia disc 17, is then engaged by a latching element 25 due to the force of a spring 26 and blocks said disc 24 so that the reel shaft 9 can no longer continue its rotation.

The operation of the embodiment of FIGS. 6, 7 and 8 will be somewhat better understood upon reference to the schematic view, FIG. 9. In FIG. 9, latch 25 will be seen to have a finger 30 projecting laterally therefrom engageable by a rib 31 on a rotor 32 nonrotatable but reciprocable on reel shaft 9 and biased toward inertia disc 17 by spring 33. Member 32 has a cam recess 34 in one side engaged by cam nose 35 on disc 17. The inclined right side of member 32 is adapted for actuating a latch lever 36 which is engageable beneath a cooperating latch element 37 fixed to finger 30. A spring 38 biases latch 36 toward disengaged position.

In operation, when disc 17 is retarded, cam nose 35 will turn relative to shaft 9 and move member 32 toward the left which will disengage rib 31 from finger 30 and will also permit latch 36 to disenage from element 37 whereupon pawl 25 will snap into engagement with ratchet wheel 24 under the influence of spring 26. The reel shaft is thereby blocked. When tension is relieved on the shaft 9, for example, by permitting it to take up the safety belt, spring 33 will move member 32 toward the right and rib 31 will push pawl 25 to its retracted position and permit latch 36 to latch element 37.

With an axially fixed control or inertia disc 17, the magnet may also be arranged parallel to the reel shaft 9, as is illustrated in FIG. 8. The rod-shaped electromagnet 27 is in slight spaced relationship to disc 17 engaging the circumference of said disc 17. Also in this instance, due to the introduced current pulse, an electric field is built up whereby the blocking operation is initiated.

As will be evident from the above, the device according to the present invention permits an extremely fine sensitive blocking of the reel shaft which blocking is effected very quickly in view of the absence of mechanical latching strokes. When a permissible acceleration or retardation value is exceeded, a control switch of the device becomes active. The magnetic field exciter which is designed as electromagnet in conformity with the invention is passed through by a current while an electric field is built up. Between the coupling disc and the iron core of the electromagnet a strong magnetic field is built up. The coupling disc is stopped by this alternating effect and due to a relative movement between the reel shaft and the coupling disc, the blocking operation is initiated.

It will also be seen that the device according to the invention permits a high sensitive control and is characterized by an extremely short time of response because as mentioned above, no blocking strokes are necessary any longer so that a high degree of safety will be assured. Moreover, the device is simple in construction and inexpensive to produce while it is practically safe from any disorders.

It is, of course, to be understood that the present invention is, by no means, limited to the specific showing in the drawings, but also comprises any modifications within the scope of the appended claims.

What is claimed is:

1. In combination with a device for initiating the blocking of the reel shaft in a safety belt mechanism, said device including inertia responsive means including a disc mounted on the reel shaft, said disc being rotatable relative to the shaft in response to acceleration of said shaft in the paying out direction, and magnet means adjacent said disc and magnetically coupled thereto for imparting a retarding force on said disc exclusively upon at least a small, peripheral segment thereof and thereby enhancing the response of said disc to acceleration of said shaft, said magnet means being an electromagnet stationarily mounted near the periphery of said disc, said disc comprising a plurality of circumferentially distributed elements in the peripheral region of the disc, said disc and said elements forming a unitary structure.

2. A device in combination according to claim 1, in which said disc has several uniformly distributed brake bodies along at least a peripheral region formed of ferromagnetic material and cooperating with said magnet means.

3. A device in combination according to claim 2, in which said disc includes a ring of ferromagnetic material and a toothed peripheral portion defining teeth for cooperation with said magnet means.

4. A device in combination according to claim 3, in which the teeth on said peripheral portion of said disc are radial teeth.

5. A device in combination according to claim 3, in which the teeth on said peripheral portion of said disc are axial teeth.

6. A device in combination according to claim 1, in which said disc includes a ring portion formed as a laminated element.

7. A device in combination according to claim 1, in which said electromagnet is bar-shaped and is arranged radially of the reel shaft.

8. A device in combination according to claim 1, in which said electromagnet is bar-shaped and is parallel to the reel shaft.

9. A device in combination according to claim 1, in which said magnet means and the outer ends of said elements are formed with parallel wedge-shaped ends.

10. A device in combination according to claim 1, in which said disc is formed with teeth for cooperation with stationarily mounted teeth so as to serve as an integral latching body for blocking said reel shaft.

11. A device in combination according to claim 1, in which said magnet means is a "U" shaped electromagnet having the periphery of the disc disposed between the free ends of the legs thereof.

12. A device in combination according to claim 1, in which said disc has at least the peripheral region thereof formed of ferromagnetic material.

* * * * *